(12) United States Patent
Lee et al.

(10) Patent No.: US 9,722,523 B2
(45) Date of Patent: Aug. 1, 2017

(54) INVERTER VECTOR DRIVING SYSTEM AND METHOD FOR ESTIMATING CAPACITANCE USING THE SAME

(71) Applicant: RESEARCH COOPERATION FOUNDATION OF YEUNGNAM UNIVERSITY, Gyeongsangbuk-do (KR)

(72) Inventors: Dong-Choon Lee, Daegu (KR); Thanh Hai Nguyen, Gyeongsangbuk-do (KR); Yoon-Cheul Jeung, Daegu (KR)

(73) Assignee: RESEARCH COOPERATION FOUNDATION OF YEUNGNAM UNIVERSITY, Gyeongsan-si, Gyeongsangbuk-Do (KR)

( * ) Notice: Subject to any disclaimer, the term of this patent is extended or adjusted under 35 U.S.C. 154(b) by 0 days.

(21) Appl. No.: 15/080,587

(22) Filed: Mar. 25, 2016

(65) Prior Publication Data

US 2016/0282392 A1  Sep. 29, 2016

(30) Foreign Application Priority Data

Mar. 25, 2015 (KR) .......................... 10-2015-0041422

(51) Int. Cl.
*H02P 21/00* (2016.01)
*H02P 21/36* (2016.01)
(Continued)

(52) U.S. Cl.
CPC .............. *H02P 21/36* (2016.02); *H02M 1/14* (2013.01); *H02M 7/5387* (2013.01)

(58) Field of Classification Search
CPC ....... H02P 21/36; H02M 1/14; H02M 7/5387; H02M 7/797; H02M 21/50; G01R 27/2605
USPC ............ 318/400.02, 599, 609; 361/155, 156, 361/271, 301.1, 738, 763, 766; 324/427, 324/519, 548, 658, 76.66, 382; 73/74
See application file for complete search history.

(56) References Cited

U.S. PATENT DOCUMENTS 6,566,764 B2 * 5/2003 Rebsdorf ................ H02P 9/007
290/44
6,758,440 B1 * 7/2004 Repp ........................ B64F 1/02
244/110 C
(Continued)

FOREIGN PATENT DOCUMENTS

KR 10-2014-0013730 A 2/2014

*Primary Examiner* — Rita Leykin
(74) *Attorney, Agent, or Firm* — Revolution IP, PLLC (57) ABSTRACT

The present invention relates to an inverter vector driving system and a method for estimating capacitance using the same. The present invention provides a method for estimating capacitance in an inverter vector driving system including a capacitor to which a rectified DC voltage of a three-phase power supply is charged, and a PWM inverter configured to transform the DC voltage into a three-phase AC voltage to be applied to a motor of an induction motor, including: operating the motor of the IM in a regeneration mode; generating a d-axis voltage command and a q-axis voltage command for the motor; adjusting a pulse of the PWM inverter by using the d-axis voltage command and the q-axis voltage command; and estimating capacitance of the capacitor by using a DC-link voltage and a DC-link current that are generated at the capacitor due to the inclusion of the AC component.

14 Claims, 5 Drawing Sheets

(51) Int. Cl.
*H02M 1/14* (2006.01)
*H02M 7/5387* (2007.01)

(56) References Cited

U.S. PATENT DOCUMENTS

| | | | | |
|---|---|---|---|---|
| 6,784,634 B2* | 8/2004 | Sweo | | H02P 9/007 290/46 |
| 7,176,648 B2* | 2/2007 | Choi | | B29C 45/7666 318/370 |
| 7,294,988 B2* | 11/2007 | Ajima | | B60K 6/26 318/430 |
| 7,485,980 B2* | 2/2009 | Ichinose | | H02P 9/007 290/44 |
| 7,511,385 B2* | 3/2009 | Jones | | H02M 5/4585 290/43 |
| 7,579,702 B2* | 8/2009 | Park | | H02J 3/386 290/44 |
| 7,940,537 B2* | 5/2011 | Abolhassani | | H02M 5/4585 363/37 |
| 8,248,039 B2* | 8/2012 | Cao | | F03D 7/0272 290/44 |
| 8,395,336 B2* | 3/2013 | Lai | | H02P 21/09 318/400.02 |
| 8,796,982 B2* | 8/2014 | Li | | H02P 23/12 318/706 |
| 8,816,625 B2* | 8/2014 | Kopiness | | H02M 1/36 318/376 |
| 8,860,335 B2* | 10/2014 | Gries | | H02M 1/12 318/112 |
| 9,030,046 B2* | 5/2015 | Lewis | | H02M 7/797 307/64 |
| 9,054,600 B2* | 6/2015 | Choi | | H02M 7/48 |
| 9,190,935 B2* | 11/2015 | Takase | | H02M 7/68 |
| 9,285,400 B2* | 3/2016 | Mehringer | | G01R 31/343 |
| 9,397,593 B2* | 7/2016 | Kato | | H02P 6/12 |
| 9,461,556 B2* | 10/2016 | Flett | | H02M 5/4585 |
| 9,535,107 B2* | 1/2017 | Yang | | G01R 31/028 |
| 2011/0276214 A1* | 11/2011 | Matsumoto | | B60L 3/0023 701/22 |
| 2013/0147442 A1* | 6/2013 | Tripathi | | F03D 7/0272 322/89 |
| 2015/0207434 A1* | 7/2015 | Wang | | H02M 7/483 363/78 |

* cited by examiner

INVERTER VECTOR DRIVING SYSTEM AND METHOD FOR ESTIMATING CAPACITANCE USING THE SAME

CROSS-REFERENCE TO RELATED APPLICATION

This application claims priority to and the benefit of Korean Patent Application No. 10-2015-0041422 filed in the Korean Intellectual Property Office on Mar. 25, 2015, the entire contents of which are incorporated herein by reference.

BACKGROUND OF THE DISCLOSURE

1. Field of the Disclosure

The present invention relates to an inverter vector driving system and a method for estimating capacitance using the same, and more particularly, an inverter vector driving system for monitoring a degradation state of a capacitor of a DC-link in a power converting device including a PWM inverter and a method for estimating capacitance using the same.

2. Description of the Related Art

Generally, a fault of a DC-link capacitor accounts for a greater part of fault types of an alternating current (AC) motor drive system. The DC-link capacitor has characteristics of decreased capacitance and increased equivalent series resistance (ESR) due to its aging effect. When capacitance is reduced by more than 20% from the initial value, the capacitor is regarded as having reached the end of its lifespan. Therefore, a technique of estimating capacitance of the DC-link capacitor in a motor drive system is essential to maintain and manage a power converting device.

The most common method for identifying capacitance of the capacitor is to use an offline measurement technique. However, this method has a problem in that, because the capacitor is separated first from the power converting device and the capacitance should be then measured using an RLC meter, a system should stop operating for measurement and the capacitor should be separated from the system.

Unlike the offline measurement technique, an online estimation technique makes it possible to estimate capacitance while the motor is being operated. There are several exemplary online estimation techniques. Among them, a technique of estimating parameters of the capacitor in a variable speed drive system includes a method of estimating capacitance of the capacitor by measuring the DC component of the capacitor current and the average variation of the capacitor and DC-link voltages during the discharging mode of capacitors in which the motor is not operated.

In addition, a technique of estimating parameters of the capacitor during deceleration of the motor's speed in a brushless DC motor system has also been presented. In this case, since calculation of the capacitance is performed only once during an estimation process, reliability of the estimation decreases. In addition, a technique of estimating capacitance using ripple components of a current and a voltage of the capacitor while the motor is normally operated has been used in the aerospace industry, but this technique has a drawback in that the DC-link requires an additional current sensor.

Background technology of the present invention has been disclosed in Korean Patent Laid-Open Publication No. 2014-013730 (Laid-open on Feb. 5, 2014).

SUMMARY OF THE DISCLOSURE

The present invention has been made in an effort to provide an inverter vector driving system for estimating capacitance of a DC-link capacitor by software without requiring additional hardware, and a method for estimating capacitance using the same.

The present invention provides a method for estimating capacitance in an inverter vector driving system including a capacitor to which a rectified DC voltage of a three-phase power supply is charged and a PWM inverter configured to transform the DC voltage into a three-phase AC voltage to be applied to an induction motor (IM), including: operating the IM in a regeneration mode; generating a d-axis voltage command using a d-axis current command of a d-q coordinate system for the motor and a d-axis DC current obtained from the motor, and generating a q-axis voltage command using a q-axis current command, a q-axis DC current obtained from the motor, a q-axis current command including a predetermined AC component, and a q-axis AC current obtained from the motor; adjusting a pulse of the PWM inverter by using the d-axis voltage command and the q-axis voltage command; and estimating capacitance of the capacitor by using a DC-link voltage and a DC-link current that are generated at the capacitor due to the inclusion of the AC component.

The DC and AC components of q-axis current can be obtained by allowing the q-axis current of the motor on the d-q coordinate system obtained during an operation of the motor to respectively pass through a band pass filter (BPF) and a band stop filter (BSF).

The generating of the d-axis voltage command and the q-axis voltage command may include: generating the d-axis voltage command by performing proportional integral control of a value obtained by subtracting the d-axis DC current from the d-axis current command; and generating the q-axis voltage command by summing a result of performing proportional integral control of a value obtained by subtracting the q-axis DC current from the q-axis current command, and a result of performing proportional resonant control of a value obtained by subtracting the q-axis AC current from a q-axis current command including the AC component.

The DC-link current ($i_{dc,cal}$) may be calculated by the following Equation.

$$i_{dc,cal} = \frac{T_{sa}i_a + T_{sb}i_b + T_{sc}i_c}{T_s}$$

Herein, $T_{sa}$, $T_{sb}$, and $T_{sc}$ respectively represent gating times for three upper switches included in the PWM inverter, $i_a$, $i_b$, and $i_c$ represent phase currents measured at three-phases of the motor, and the $T_s$ represents a sampling time.

The estimating of capacitance of the capacitor may include estimating capacitance of the capacitor by using the recursive least square algorithm (RLS algorithm) such that an error cost function has a minimum value.

$$e^2(n) = [\text{BPF}[i_{dc}(n)] - \hat{C}(n)\text{BPF}[v'_{dc}(n)]]^2$$

Herein, $e^2(n)$ is an error cost function, $\text{BPF}[\cdot]$ is an output value passed through the band pass filter (BPF), $i_{dc}$ is the DC-link current, $v_{dc}$ is the DC-link voltage, and $\hat{C}(n)$ is estimated capacitance of the capacitor.

The estimated capacitance of the capacitor may be updated by the following equation.

$$\hat{C}(n+1) = \hat{C}(n) + \mu(n)\text{BPF}[v'_{dc}(n)] \times \{\text{BPF}[i_{dc}(n)] - \hat{C}(n)\text{BPF}[v'_{dc}(n)]\}$$

Herein, μ(n) is a gain correction value.

The present invention provides an inverter vector driving system for estimating capacitance including: a capacitor to which a rectified DC voltage of a three-phase power supply is charged; a PWM inverter configured to transform the DC voltage into a three-phase AC voltage to be applied to the IM; a calculating unit configured, while the motor is operated in a regeneration mode, to generate a d-axis voltage command using a d-axis current command of a d-q coordinate system for the motor and a d-axis DC current obtained from the motor, and to generate a q-axis voltage command using a q-axis current command, a q-axis DC current obtained from the motor, a q-axis current command including a predetermined AC component, and a q-axis AC current obtained from the motor; a pulse adjusting unit configured to adjust a pulse of the PWM inverter by using the d-axis voltage command and the q-axis voltage command; and an estimating unit configured to estimate capacitance of the capacitor by using a DC-link voltage and a DC-link current which are generated at the capacitor by the inclusion of the AC component.

The inverter vector driving system and the method for estimating capacitance using the same according to the present invention provides the advantage of estimating capacitance of the DC-link capacitor by software without requiring additional hardware during the operation of the motor. Accordingly, before the fault of the capacitor occurs, when to replace the capacitor can be predetermined and accuracy of the capacitance estimation can be enhanced.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive, and like reference numerals designate like elements throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising" will be understood to imply the inclusion of stated elements but not the exclusion of any other elements.

Figure 1:
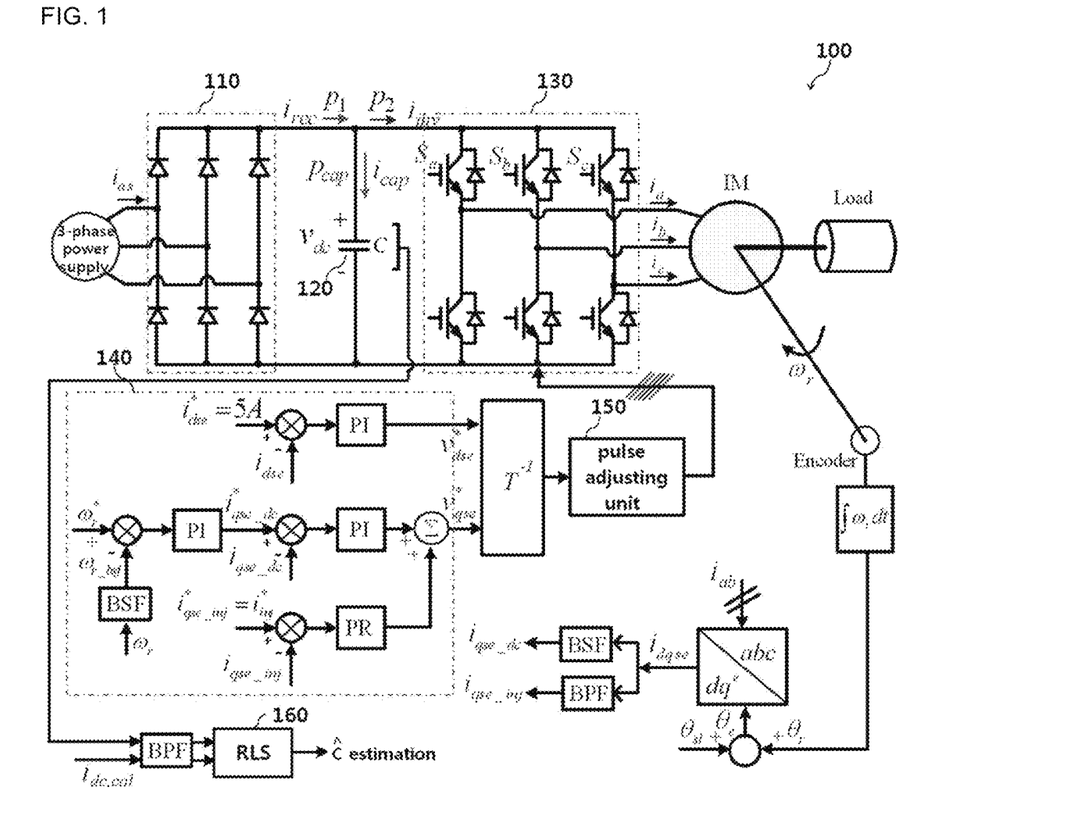
FIG. 1 illustrates an inverter vector driving system for estimating capacitance according to an exemplary embodiment of the present invention.

FIG. 1 illustrates an inverter vector driving system for estimating capacitance according to an exemplary embodiment of the present invention. Referring to FIG. 1, the inverter vector driving system 100 according to the current exemplary embodiment of the present invention includes a rectifier 110, a DC-link capacitor 120, a PWM inverter 130, a calculating unit 140, a pulse adjusting unit 150, and an estimating unit 160.

The rectifier 110 is configured to include a plurality of diodes, and rectifies three-phase AC power received from a three-phase power supply to a DC voltage. The DC-link capacitor 120 serves to electrically store the DC voltage that is rectified by the rectifier 110.

The PWM inverter 130 converts the DC voltage to a three-phase AC voltage by pulse width modulation (PWM) switching while being connected to the capacitor 120, and supplies the three-phase AC voltage to a motor of an induction motor. The PWM inverter 130 has a three-phase full bridge configuration that uses 6 switches and 6 diodes.

The induction motor (IM) is operated at a speed corresponding to the AC voltage supplied according to the PWM switching. When a motor speed ($\omega_r$) of the IM obtained by a position sensor such as an encoder is integrated, a position (associated with a θ value) may be estimated, and the position may be used to convert the abc-axis coordinate system for the motor to the d-q axis rotational coordinate system.

In the d-q axis coordinate system, the d-axis is associated with a flux component, while the q-axis is associated with a torque component. Accordingly, a flux component current and a torque component current may be separated from each other. The detailed configurations and principles of measuring the position of a motor and converting the abc-axis coordinate system to the d-q axis coordinate system have been previously disclosed, so detailed descriptions thereof will be omitted.

In the current exemplary embodiment of the present invention, the motor of the IM should be operated in a regeneration mode to estimate capacitance of the capacitor 120. In the regeneration mode (deceleration section of the motor), a DC-link part is separated from the rectifier 110. The reason is as follows.

Energy regenerated by the motor's deceleration causes the DC-link voltage to increase and a potential difference generated by the increased voltage causes the diode of the rectifier 110 to be in reverse bias, such that power is not supplied from the three-phase power supply to the DC-link. Consequently, the three-phase power supply and the capacitor 120 are separated from each other. Accordingly, when the IM is operated in the regeneration mode, the capacitance of the capacitor 120 may be estimated without physically separating the capacitor 120 from the IM.

An operation of the IM in the regeneration mode will be described in detail as follows. In FIG. 1, a relationship between powers in the DC-link part is illustrated. Assuming that there is no power loss, the relationship between powers will be summarized by the following Equation 1.

$$p_1 = p_2 + p_{cap} = p_2 + Cv_{dc}\frac{dv_{dc}}{dt} \quad \text{(Equation 1)}$$

Herein, $p_1$ and $p_2$ are input and output powers of the DC-link, and $p_{cap}$ is power of the capacitor 120 in the DC-link. C is the capacitance of the capacitor 120, and $v_{dc}$ represents the voltage of the DC-link, i.e., a voltage of the capacitor 120.

When loss at the power converter is neglected, the output power $p_2$ of the DC-link may be represented by input power $p_m$ of the IM as in the following Equation 2.

$$p_2 = p_m = J\omega_m \frac{d\omega_m}{dt} + B\omega_m^2 + P_{load} \quad \text{(Equation 2)}$$

Herein, J is inertia, $\omega_m$ is a speed of the motor, B is a friction coefficient, $P_{load}$ is load power for the motor.

Assuming that the load power is 0 (no-load condition) while estimating parameters of the capacitor operated in the regeneration mode (the deceleration section of the motor), Equation 2 may be summarized as the following Equation 3.

$$p_2 = J\omega_m \frac{d\omega_m}{dt} + B\omega_m^2 \quad \text{(Equation 3)}$$

In the motor's deceleration section, the capacitor of the DC-link is charged resulting in the increase of the DC-link voltage, so it is electrically separated from the rectifier 110 by a potential difference there between. Then, the capacitor's current may be reconfigured by the motor current and the inverter switching state.

For vector control of the IM, the current exemplary embodiment of the present invention adopts a cascade control structure including speed control and current control on the d-q coordinate system. While estimating capacitance of the DC-link, a constant deceleration ratio is set to the motor.

When operated in the regeneration mode, no power is transmitted from the AC power supply to the DC-link. Accordingly, $p_1$ becomes zero, and resultantly, $p_2$ becomes $-p_{cap}$. $p_1$ of Equation 1 is substituted by zero and is then combined with Equation 3, which will be summarized as the following Equation 4.

$$\frac{d\omega_m}{dt} = -\frac{B}{J}\omega_m - \frac{Cv_{dc}}{J\omega_m}\frac{dv_{dc}}{dt} \quad \text{(Equation 4)}$$

Referring to Equation 4, it can be seen that the deceleration ratio of the motor is determined by inertia (J), a friction coefficient (B), and the capacitance (C) and the voltage ($v_{dc}$) of the DC-link.

In the current exemplary embodiment of the present invention, when performing the vector control of the IM, the AC component is injected into the q axis of the synchronous coordinate system, voltage and current of the AC component appear at the DC-link voltage, and using those capacitance is estimated.

That is, in the current exemplary embodiment of the present invention, in order to generate the AC voltage and the current ripple component in the DC-link, the AC current component is applied to a current command value of a q-axis stator of the motor. As such, when the AC component is injected to the q-axis current, ripples are generated in the DC-link voltage and current.

The AC component injected to the current command will be expressed by the following Equation 5.

$$i^*_{inj}(t) = I_{inj} \cdot \sin(2\pi f_{inj} t) \quad \text{(Equation 5)}$$

Herein, $I_{inj}$ and $f_{inj}$ represent the amount of and the frequency of the injected current. As described above, the AC component current is used to generate the AC components of the voltage and current in the DC link for estimating the capacitor's capacitance.

In Equation 5, the superscript * means a command value (value which should be followed), and as described above, represents the q-axis current command value in which the AC component is injected. The q-axis current measured in an actual motor may have the form of the current signal including the AC component, as shown in the command form of Equation 5.

In the current exemplary embodiment of the present invention, since $I_{inj} = 3$ A and $f_{inj} = 30$ Hz are used, Equation 5 will be summarized as the following Equation 6.

$$i^*_{inj}(t) = 3 \cdot \sin(2\pi \cdot 30 t) \quad \text{(Equation 6)}$$

Based on the above description, a method for estimating capacitance using an inverter vector driving system according to an exemplary embodiment of the present invention will now be described in detail.

First, an inverter vector driving system 100 decelerates an IM in a regeneration mode. For example, the IM is decelerated at a constant rate of 195 rad/s².

When the motor is operated in the regeneration mode (deceleration section of the motor), a calculating unit 140 generates a d-axis current command ($i^*_{dse}$) of the d-q coordinate system for the motor and a d-axis voltage command ($v^*_{dse}$) using and the d-axis DC current ($i_{dse}$) obtained from the motor. In addition, the calculating unit 140 generates a q-axis voltage command ($v^*_{qse}$) using a q-axis current command ($i^*_{qse\_dc}$), a q-axis DC current ($i_{qse\_dc}$) obtained from the motor, a q-axis current command ($i^*_{qse\_inj}$) including a predetermined AC component, and a q-axis AC current ($i_{qse\_inj}$) obtained from the motor.

With reference to FIG. 1, this will be described in more detail as follows. The calculating unit 140 generates the d-axis voltage command ($v^*_{dse}$) by obtained performing proportional integral (PI) control of a value which is obtained by subtracting the d-axis DC current ($i_{dse}$) from the d-axis current command ($i^*_{dse} = 5$ A). In this case, the d-axis DC current ($i_{dse}$) may be obtained by being separated from the $i_{dqse}$ which is a value of the dq-axis current obtained from the d-q coordinate system.

In addition, calculating unit 140 generates the q-axis voltage command ($v^*_{qse}$) by summing together ($\Sigma$) a result of performing proportional integral (PI) control of a value which is obtained by subtracting the q-axis DC current ($i_{qse\_dc}$) obtained from the motor from the q-axis current command ($i^*_{qse\_dc}$) of the d-q coordinate system, and a result of proportional resonant (PR) control of a value which is obtained by subtracting the q-axis AC current ($i_{qse\_inj}$) from the q-axis current command ($i^*_{qse\_inj}$) including the AC component.

In the current exemplary embodiment of the present invention, it can be seen that control information associated with the AC current command is integrated into the q-axis. That is, the q-axis current is controlled to further follow the AC component in addition to the DC component such that the AC component appears in the DC-link.

The q-axis current command ($i^*_{qse\_dc}$) used to calculate the q-axis voltage command ($v^*_{qse}$) is obtained by performing proportional integral (PI) of a value obtained by subtracting a value ($\omega_{r\_bsf}$) where ripples are eliminated by allowing the motor's speed (107$_r$) to pass through the band stop filter (BSF) from a speed command (w*$_r$). The q-axis DC current ($i_{qse\_dc}$) is a DC component value which is obtained by allowing the q-axis current of the motor on the d-q coordinate system (q-axis $i_{qse}$ component of a value of the dq-axis current $i_{dqse}$) to pass through the band stop filter (BSF).

The q-axis current command ($i*_{qse\_inj}$) including the AC component represents the $I*_{inj}$ that is represented in Equation 5 above. The q-axis AC current ($i_{qse\_inj}$) is obtained by allowing the q-axis current ($i_{qse}$ component) of the motor on the d-q coordinate system to pass through the band pass filter (BPF). Frequency components of the current are passed through by the band pass filter (BPF).

In the exemplary embodiment of the present invention, a cut-off frequency of 30 Hz for the band pass filter (BPF) and the band stop filter (BSF) is used to extract the AC and DC components of the q-axis current. Each of these filters may be implemented by software. As described above, the dq-axis voltage command may be calculated and outputted by performing control of using each of the command currents.

When the dq-axis voltage command is calculated, a pulse adjusting unit 150 adjusts a pulse of a PWM inverter 130, using the calculated d-axis voltage command (v*$_{dse}$) and the q-axis voltage command (v*$_{qse}$). In more detail, as illustrated in FIG. 1, a three-phase voltage command may be applied to the PWM inverter 130 by performing inverse d-q transformation $T^{-1}$ of the dq-axis voltage command, thereby controlling the switching.

In this case, an estimating unit 160 may estimate capacitance of the capacitor 120, using the DC-link voltage ($v_{dc}$) and the DC-link current ($i_{dc,cal}$) generated due to inclusion of the AC component on the capacitor 120 when the AC component is injected.

In this case, the DC-link voltage ($v_{dc}$) may be measured from the DC-link, and the DC-link current ($i_{dc,cal}$) may be calculated by the following Equation 7.

$$i_{dc,cal} = \frac{T_{sa}i_a + T_{sb}i_b + T_{sc}i_c}{T_s} \quad \text{(Equation 7)}$$

Herein, $T_{sa}$, $T_{sb}$, and $T_{sc}$ respectively represent gating times for three upper ones of six switches included in the PWM inverter, $i_a$, $i_b$, and $i_c$ represent phase currents measured at three-phases of the motor, and the $T_s$ represents a sampling time. The gating time means a time for which a switch is turned on.

As described above, the DC-link current ($i_{dc,cal}$) is a value which can be calculated using the Equation according to the switching state. Of course, the previous condition of $p_1=0$ and $p_2=-p_{cap}$ will satisfy $i_{cap}=-i_{dc,cal}$.

A method of estimating, by the estimating unit 160, the capacitance of the capacitor 120 using the DC-link voltage ($v_{dc}$) and the DC-link current ($i_{dc,cal}$) of the DC-link part will be described as follows.

First, a relationship between a current and a voltage of the capacitor will be represented by Equation 8.

$$i = C\frac{dv}{dt} = Cv' \quad \text{(Equation 8)}$$

Herein, I represents $i_{cap}$, and v represents $v_{dc}$. Assuming that there is no load, when Equation 8 is applied to the capacitor 120 according to the current exemplary embodiment of the present invention, the following Equation 9 is obtained.

$$i_{dc} = C\frac{dv_{dc}}{dt} = Cv'_{dc} \quad \text{(Equation 9)}$$

Herein, $i_{dc}$ represents a DC-link current, and $v_{dc}$ represents the capacitor voltage. $i_{dc}$ of Equation 9 is substituted by the value of $i_{dc,cal}$ obtained from Equation 7. In the current exemplary embodiment of the present invention, $i_{dc}$ and $v_{dc}$ are values that are known from calculation or measurement, and a value of C is an unknown value.

After being passing through the band pass filter (BPF), the value of Equation 9 may be represented by the following Equation 10.

$$BPF[i_{dc}] = C \times BPF[v'_{dc}] \quad \text{(Equation 10)}$$

Herein, BPF[·] represents an output value which is passed through the band pass filter (BPF). BPF filters the DC-link voltage and current. Herein, $i_{dc}$ represents a value of $i_{dc,cal}$, as described above.

In the current exemplary embodiment of the present invention, the estimating unit 160 estimates the capacitance of the capacitor 120 by using the recursive least square algorithm (RLS algorithm), such that an error cost function disclosed in the following Equation 11 has a minimum value.

$$e^2(n) = \lfloor BPF[i_{dc}(n)] - \hat{C}(n)BPF[v'_{dc}(n)] \rfloor^2 \quad \text{(Equation 11)}$$

Herein, $e^2(n)$ is an error cost function, BPF[·] is an output value passed through the band pass filter (BPF), $i_{dc}$ is a value of $i_{dc,cal}$ which is a DC-link current, $v_{dc}$ is a DC-link voltage, and is $\hat{C}(n)$ is estimated capacitance of the capacitor.

In this case, the estimated capacitance $\hat{C}(n)$ of the capacitor should be updated such that the error cost function $e^2(n)$ has the minimum value. Accordingly, $\hat{C}(n)$ may be updated by the following Equation 12.

$$\hat{C}(n+1) = \hat{C}(n) + \quad \text{(Equation 12)}$$
$$\mu(n)BPF[v'_{dc}(n)] \times \{BPF[i_{dc}(n)] - \hat{C}(n)BPF[v'_{dc}(n)]\}$$

Herein, $\mu(n)$ is a gain correction value, and the gain correction value of $7.5 \times 10^{-8}$ can be used in the current exemplary embodiment of the present invention.

Hereinafter, in order to ensure performance and effects of the method for estimating capacitance according to the current exemplary embodiment of the present invention, results of applying the current exemplary embodiment of the present invention to a 3 kW induction motor (IM) driving system will be described.

Figure 2:
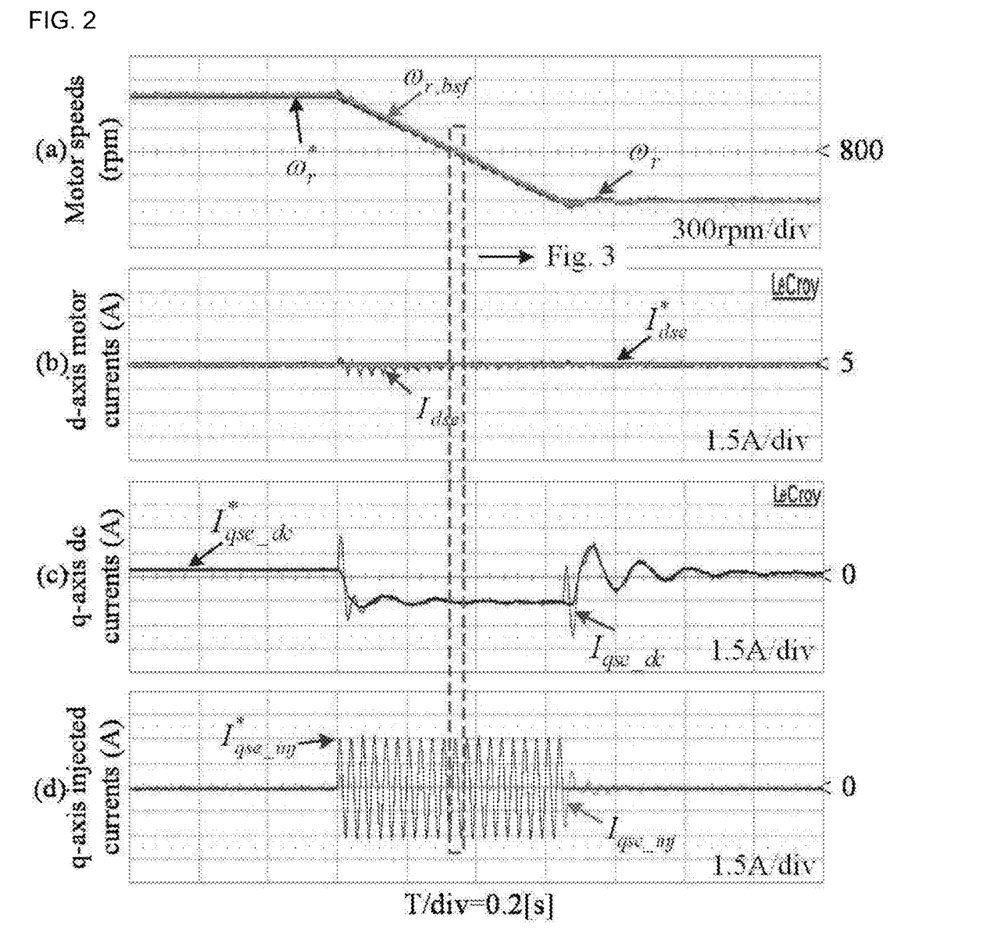
FIG. 2 illustrates control performance of an induction motor in an exemplary embodiment of the present invention.

FIG. 2 illustrates control performance of an IM in an exemplary embodiment of the present invention. In FIG. 2, a motor is decelerated at 1500 rpm by a certain deceleration ratio with time.

First, FIG. 2(*a*) shows a speed ($\omega$) of the motor. The motor's speed ($\omega_r$) follows an command value ($\omega*_r$). It can be seen that FIG. 2(*b*) shows a d-axis current ($i_{dse}$) of the motor and ripples are generated in a deceleration section.

FIG. 2(*c*) shows a DC component ($I_{qse\_dc}$) of a q-axis current of the motor, and the current has a negative value since the motor is operated in a regeneration mode in the deceleration section. The currents before and after the deceleration are values that are represented by inertia of the motor. It can be seen that FIG. 2(d) shows an AC component ($I_{qse\_inj}$) of the q-axis current of the motor and is well controlled by a PR controller to follow an command value ($I^*_{qse\_inj}$).

Figure 3:
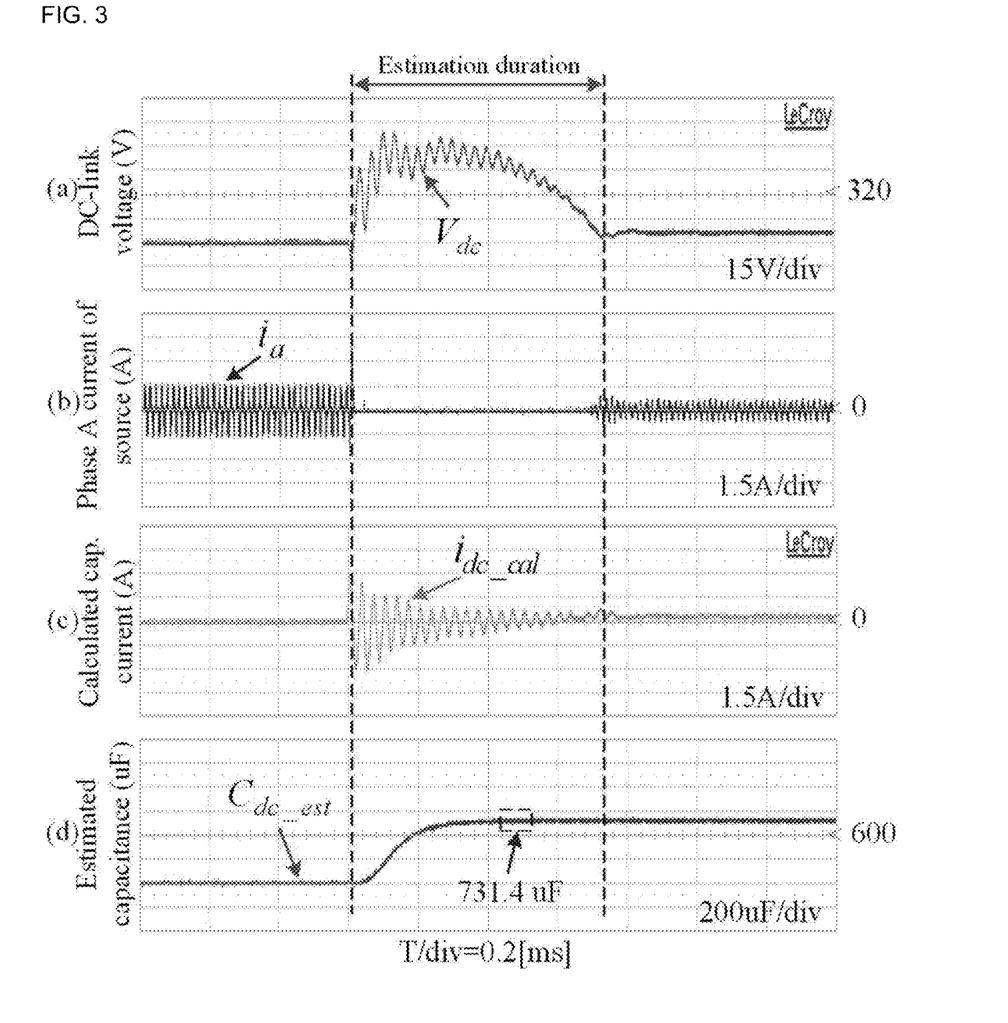
FIG. 3 illustrates DC-link a voltages and currents and results of estimating capacitance using the same at a section where the induction motor is operated in a regeneration mode in an exemplary embodiment of the present invention.

FIG. 3 illustrates a DC-link voltage and a DC-link current and results of estimating capacitance using the same at a section where the IM is operated in a regeneration mode in an exemplary embodiment of the present invention. In the current exemplary embodiment of the present invention, capacitance is estimated in the section where the motor is decelerated (regeneration mode), and in FIG. 3, the corresponding section is indicated by "Estimation duration".

FIG. 3(a) shows a DC-link voltage ($V_{dc}$), and it can be seen that a DC voltage is increased in the regeneration mode and an injected ripple voltage is also identified. FIG. 3(b) shows an a-phase current ($i_a$) which is input to a diode rectifier 110 from a three-phase power supply. In the regeneration section, it can be seen that power is not transmitted from the three-phase power supply to the DC-link.

FIG. 3(c) shows a current ($I_{dc,cal}$) of the DC-link which is calculated in the regeneration mode (deceleration section of the motor). The current of the DC-link is calculated using a three-phase current of the IM and a switch state of the inverter as in Equation 7.

FIG. 3(d) shows capacitance of the capacitor which is estimated by Equation 12 using the DC-link voltage ($v_{dc}$) of FIG. 3(a) and the DC-link current ($i_{dc,cal}$) of FIG. 3(c). The resultant capacitance is estimated to be 731.4 uF. The estimation error is 0.91%.

Figure 4:
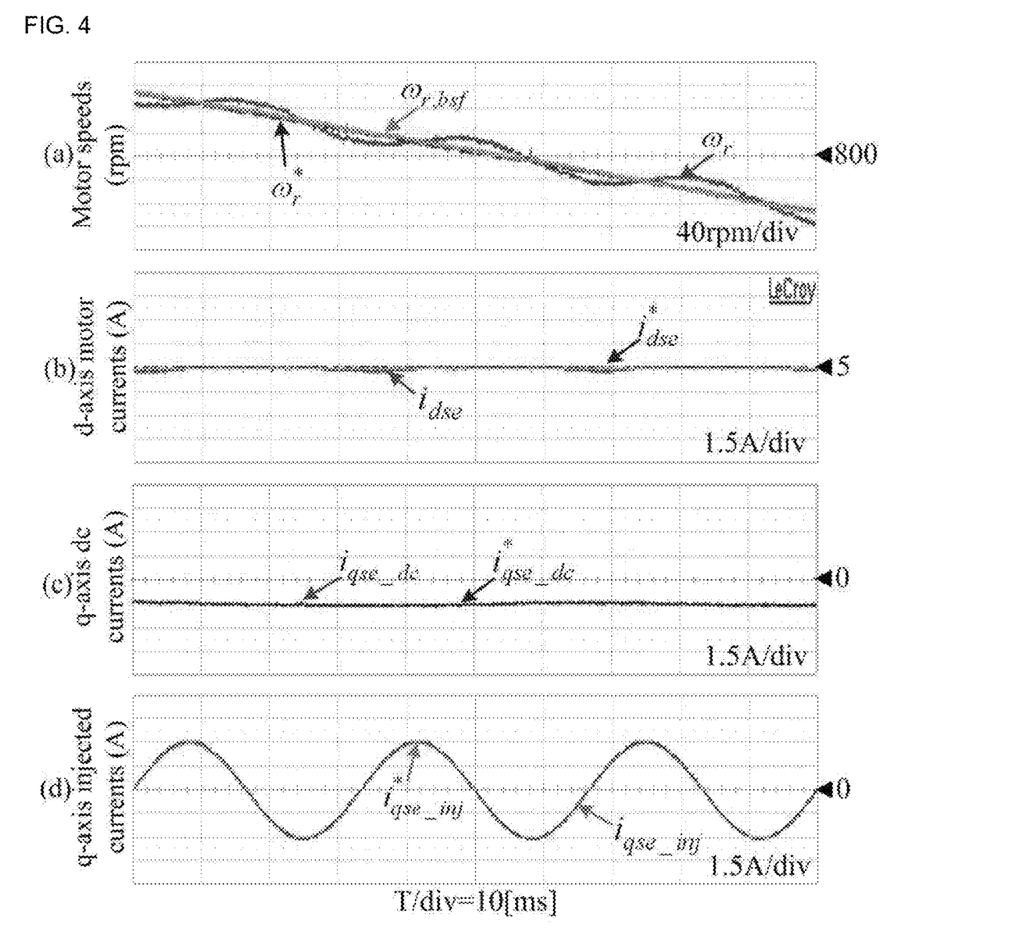
FIG. 4 illustrates enlarged waveforms of a motor deceleration section of FIG. 2.

FIG. 4 illustrates enlarged waveforms of a motor deceleration section of FIG. 2. In FIG. 4(a), a speed command value ($\omega^*_r$), a speed measurement value ($\omega^*_r$), and speed measurement value ($\omega_{bsf}$) which is passed through the band stop filter (BSF) of the motor are shown. It can be seen that the speed measurement value ($\omega_r$) decreases since it follows the speed command value ($\omega^*_r$), and the speed measurement value ($\omega_{bsf}$) passed through the BSF is the speed measurement value ($\omega_r$) from which ripples are eliminated.

FIG. 4(b) shows a d-axis current ($i_{dse}$) a of the motor which follows a command value ($i^*_{dse}$). In FIG. 4(c), a DC component ($I_{qse\_dc}$) of a q-axis current of the motor follows a command value ($I^*_{qse\_dc}$). FIG. 4(d) shows a command value ($I^*_{qse\_inj}$) of an AC component which is injected into the q-axis current of the motor and a measured value ($I_{qse\_inj}$), and the measured value follows the command value.

Figure 5:
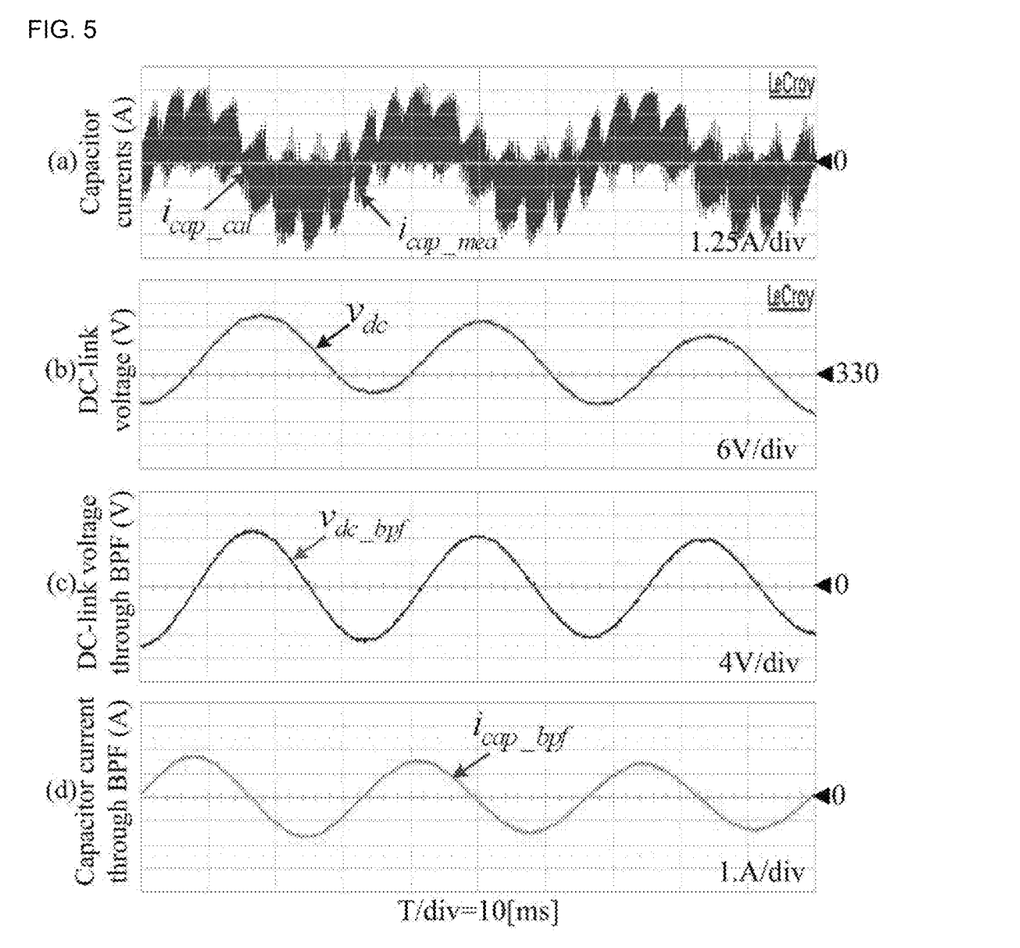
FIG. 5 illustrates signal processing results of DC-link voltages and currents in an exemplary embodiment of the present invention.

FIG. 5 illustrates signal processing results of a DC-link voltage and DC-link current in an exemplary embodiment of the present invention. FIG. 5(a) shows a calculated current ($i_{cap\_cal} = i_{dc,cal}$) of a capacitor and an actually measured current ($i_{cap\_mea}$) of the capacitor. It can be seen that a value of the calculated current is similar to that of the actual current.

FIG. 5 (b) shows a voltage having 30 Hz ripples in a DC-link. FIG. 5(c) and (d) respectively show waveforms of a DC voltage and a DC-link current with 30 Hz ripples which are filtered by the band pass filter (BPF).

According to the exemplary embodiment of the present invention, the DC-link voltage, which is separated from a rectifier when the motor is operated in a regeneration mode, increases, and the current of capacitor is measured by a current of a stator and a switching time of an inverter. When an AC component is injected into a q-axis current of the stator of the motor, a current and a voltage of the AC component appear at the capacitor of the DC-link, and the capacitance can be precisely estimated by using the RLS algorithm to which the corresponding current and voltage are applied.

As described above, the method for estimating capacitance according to the current exemplary embodiment of the present invention may be used as a DC-link estimation technique for industrial motor driving systems, and a degradation state of the capacitor can be estimated online and with a low estimation error by simply adding software without requiring additional hardware. In addition, using the parameter estimation, when to replace the capacitor can be determined before the fault of the capacitor occurs, the inverter's fault associated with aging of the capacitor can be prevented in advance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Consequently, the true technical protective scope of the present invention must be determined based on the technical spirit of the appended claims.

What is claimed is:

1. A method for estimating capacitance in an inverter vector driving system including a capacitor to which a rectified DC voltage of a three-phase power supply is charged and a PWM inverter configured to transform the DC voltage into a three-phase AC voltage to be applied to an induction motor (IM), comprising:
    operating the motor in a regeneration mode;
    generating a d-axis voltage command using a d-axis current command of a d-q coordinate system for the motor and a d-axis DC current obtained from the motor, and generating a q-axis voltage command using a q-axis current command, a q-axis DC current obtained from the motor, a q-axis current command including a predetermined AC component, and a q-axis AC current obtained from the motor;
    adjusting a pulse of the PWM inverter by using the d-axis voltage command and the q-axis voltage command; and
    estimating capacitance of the capacitor by using a DC-link voltage and a DC-link current that are generated at the capacitor due to the inclusion of the AC component.

2. The method of claim 1, wherein
the q-axis AC current and the q-axis DC current are obtained by allowing the q-axis current of the motor on the d-q coordinate system obtained during an operation of the motor to respectively pass through a band pass filter (BPF) and a band stop filter (BSF).

3. The method of claim 1, wherein
the generating of the d-axis voltage command and the q-axis voltage command includes:
    generating the d-axis voltage command by performing proportional integral control of a value obtained by subtracting the d-axis DC current from the d-axis current command; and
    generating the q-axis voltage command by summing a result of performing proportional integral control of a value obtained by subtracting the q-axis DC current from the q-axis current command, and a result of performing proportional resonant control of a value obtained by subtracting the q-axis AC current from a q-axis current command including the AC component.

4. The method of claim 1, wherein
the DC-link current ($i_{dc,cal}$) is calculated by the following Equation:

$$i_{dc,cal} = \frac{T_{sa}i_a + T_{sb}i_b + T_{sc}i_c}{T_s}$$

wherein, $T_{sa}$, $T_{sb}$, and $T_{sc}$ respectively represent gating times for three upper switches included in the PWM inverter, $i_a$, $i_b$, and $i_c$ represent phase currents measured at three-phases of the motor, and the $T_s$ represents a sampling time.

5. The method of claim 4, wherein
the estimating of capacitance of the capacitor includes
estimating capacitance of the capacitor by using the recursive least square algorithm (RLS algorithm) such that an error cost function has a minimum value:

$$e^2(n) = [\text{BPF}[i_{dc}(n)] - \hat{C}(n)\text{BPF}[v'_{dc}(n)]]^2$$

wherein, $e^2(n)$ is an error cost function, $\text{BPF}[\cdot]$ is an output value passed through the band pass filter (BPF), $i_{dc}$ is the DC-link current, $v_{dc}$ is the DC-link voltage, and $\hat{C}(n)$ is estimated capacitance of the capacitor.

6. The method of claim 5, wherein
the estimated capacitance of the capacitor is updated by the following equation:

$$\hat{C}(n+1) = \hat{C}(n) + \mu(n)BPF[v'_{dc}(n)] \times \{BPF[i_{dc}(n)] - \hat{C}(n)BPF[v'_{dc}(n)]\}$$

wherein, $\mu(n)$ is a gain correction value.

7. An inverter vector driving system for estimating capacitance comprising:
a capacitor to which a rectified DC voltage of a three-phase power supply is charged;
a PWM inverter configured to transform the DC voltage into a three-phase AC voltage to be applied to a motor of an IM;
a calculating unit configured, while the motor is operated in a regeneration mode, to generate a d-axis voltage command using a d-axis current command of a d-q coordinate system for the motor and a d-axis DC current obtained from the motor, and to generate a q-axis voltage command using a q-axis current command, a q-axis DC current obtained from the motor, a q-axis current command including a predetermined AC component, and a q-axis AC current obtained from the motor;
a pulse adjusting unit configured to adjust a pulse of the PWM inverter by using the d-axis voltage command and the q-axis voltage command; and
an estimating unit configured to estimate capacitance of the capacitor by using a DC-link voltage and a DC-link current which are generated at the capacitor by the inclusion of the AC component.

8. The system of claim 7, wherein
the q-axis AC current and the q-axis DC current are obtained by
allowing the q-axis current of the motor on the d-q coordinate system obtained during an operation of the motor to respectively pass through a band pass filter (BPF) and a band stop filter (BSF).

9. The system of claim 7, wherein
the calculating unit is configured to
generate the d-axis voltage command by performing proportional integral control of a value obtained by subtracting the d-axis DC current from the d-axis current command, and
to generate the q-axis voltage command by summing a result of performing proportional integral control of a value obtained by subtracting the q-axis DC current from the q-axis current command and a result of performing proportional resonant control of a value obtained by subtracting the q-axis AC current from a q-axis current command including the AC component.

10. The system of claim 7, wherein
the DC-link current ($i_{dc,cal}$) is calculated by the following equation:

$$i_{dc,cal} = \frac{T_{sa}i_a + T_{sb}i_b + T_{sc}i_c}{T_s}$$

wherein, $T_{sa}$, $T_{sb}$, and $T_{sc}$ respectively represent gating times for three upper switches included in the PWM inverter, $i_a$, $i_b$, and $i_c$ represent phase currents measured at three-phases of the motor, and the $T_s$ represents a sampling time.

11. The system of claim 10, wherein
the estimating unit is configured to estimate
capacitance of the capacitor by using the recursive least square algorithm (RLS algorithm) such that an error cost function has a minimum value:

$$e^2(n) = [\text{BPF}[i_{dc}(n)] - \hat{C}(n)\text{BPF}[v'_{dc}(n)]]^2$$

wherein, $e^2(n)$ is an error cost function, $\text{BPF}[\cdot]$ is an output value passed through the band pass filter (BPF), $i_{dc}$ is the DC-link current, $v_{dc}$ is the DC-link voltage, and $\hat{C}(n)$ is estimated capacitance of the capacitor.

12. The system of claim 11, wherein
the estimated capacitance of the capacitor is updated by the following equation:

$$\hat{C}(n+1) = \hat{C}(n) + \mu(n)BPF[v'_{dc}(n)] \times \{BPF[i_{dc}(n)] - \hat{C}(n)BPF[v'_{dc}(n)]\}$$

wherein, $\mu(n)$ is a gain correction value.

13. The method of claim 2, wherein
the generating of the d-axis voltage command and the q-axis voltage command includes:
generating the d-axis voltage command by performing proportional integral control of a value obtained by subtracting the d-axis DC current from the d-axis current command; and
generating the q-axis voltage command by summing a result of performing proportional integral control of a value obtained by subtracting the q-axis DC current from the q-axis current command, and a result of performing proportional resonant control of a value obtained by subtracting the q-axis AC current from a q-axis current command including the AC component.

14. The system of claim 8, wherein
the calculating unit is configured to
generate the d-axis voltage command by performing proportional integral control of a value obtained by subtracting the d-axis DC current from the d-axis current command, and
to generate the q-axis voltage command by summing a result of performing proportional integral control of a value obtained by subtracting the q-axis DC current from the q-axis current command and a result of performing proportional resonant control of a value obtained by subtracting the q-axis AC current from a q-axis current command including the AC component.

\* \* \* \* \*